United States Patent Office 3,728,142
Patented Apr. 17, 1973

---

3,728,142
READILY DISPERSIBLE INORGANIC PIGMENTS
Hans Rudolph, Krefeld-Bockum, Gerhard Trenczek, Krefeld-Uerdingen, and August Böckmann, Klaus Prater, and Walter Gutsche, Krefeld, Germany, assignors to Farbenfabriken Bayer Aktiengesellschaft, Leverkusen, Germany
No Drawing. Filed Dec. 28, 1970, Ser. No. 102,124
Claims priority, application Germany, Jan. 14, 1970, P 20 01 381.4
Int. Cl. C09c 1/36
U.S. Cl. 106—300                                7 Claims

ABSTRACT OF THE DISCLOSURE

An inorganic pigment such as titanium dioxide is rendered readily dispersible by providing it with a coating of an alkyd resin including radicals of a polycarboxylic acid and at least about 25% by weight of the radicals of fatty acids containing more than 6 carbon atoms, and further including radicals of polyols containing at least 3 hydroxyl groups, the ratio of oxygen atoms to carbon atoms in the polyol molecule not exceeding 0.7:1.

---

This invention relates to readily dispersible inorganic pigments and to a process for their production.

It is known that inorganic pigments can be after-treated with organic substances in order to improve their dispersibility, for example in plastics such as PVC, polycarbonate, polystyrene, polyethylene, in lacquer resin binders, plasticizers etc.

The following substances inter alia have been recommended for use as after-treatment agents: polyols (British patent specification 896,067), in particular pentaerythritol and trimethylol propane, alkylene oxides and high molecular weight condensation products of alkylene oxides with amines, phenols, long-chain fatty alcohols (British patent specifications 944,292; 1,115,334; U.S. patent specification 2,907,670) and non-drying, fatty-acid-modified alkyd resins (U.S. patent specification 2,479,836).

When pigments so treated are made up into pastes with plasticizers to be added to a plastic, the resulting pastes are characterized by very high viscosities, or the disadvantage of these pigments consists in the tendency of turning dark gray in color when treated thermally e.g. during a grinding process.

It is accordingly an object of the present invention to after-treat inorganic pigments, especially titanium dioxide, in such a manner that the pigment will be readily dispersible in plastics, that the pigment when made up into pastes, results pastes exhibiting low viscosities, and that the pigment have a diminished tendency of turning gray in color when thermally treated e.g. during the grinding process.

This and other objects and advantages are realized in accordance with the present invention which provides inorganic pigments coated with non-drying fatty-acid-modified alkyd resins.

The resin contains besides radicals of organic polycarbonic acid a total amount of at least 25% by weight of organic fatty acid units containing more than 6 carbon atoms, and radicals of polyols containing at least 3 hydroxyl groups, the ratio of oxygen atoms to carbon atoms in the polyol molecule not exceeding 0.7:1.

It has surprisingly been found that alkyd resins of this kind may be used with particular advantage as after-treatment agents with considerable improvements in relation to conventional after-treatment agents in that pigments coated in accordance with the invention when made up into pastes with a plasticizer, prior to incorporation into a plastic, exhibit lower viscosities or, as a corollary, at a given paste viscosity it will be possible to have a higher pigment concentration when working with the new pigments.

A further improvement in relation to conventoinal after-treatment agents is that the pigments coated in accordance with the invention surprisingly retain their outstanding dispersion behavior, even in the event of prolonged storage.

Suitable starting products for producing the resins used in accordance with the invention include the starting materials commonly used for alkyd resins, for example phthalic acid anhydride, adipic acid and maleic acid anhydride as polycarboxylic acids or their derivatives respectively.

Saturated and unsaturated monocarboxylic acids with at least 7 carbon atoms and preferably saturated monocarboxylic acids with 7 to 18 carbon atoms, such as for example caprylic acid, 2-ethyl hexanoic acid, capric acid, lauric acid and palmitic acid are used as the fatty acids. Other suitable fatty acids include those of the kind occurring in the so-called "first runnings" and "main runnings" in the oxidation of paraffins. Particularly suitable polyols containing at least 3 OH groups in which the ratio of oxygen to carbon atoms in the molecule does not exceed 0.7:1 include trimethylol ethane, trimethylol propane, trimethylol butane, 1,2,6-hexane triol and 3,4-bis-(hydroxymethyl)-1,6-hexane diol. Trimethylol propane is particularly suitable. Diols, for example 1,3-butane diol, 1,4-butane diol and 1,6-hexane diol, may also be used in smaller quantities. The polyesters used in accordance with the invention are produced by the method commonly used for alkyd resins (cf. C. R. Martens, "Alkyd Resin," Reinhold Publishing Corporation, New York, 1961, pp. 51 et seq.), i. e. by condensation at elevated temperatures, temperatures in the range of from 180° C. to 250° C. being preferred. Where necessary, condensation can also be carried out in the presence of catalysts such as for example dibutyl tin oxide or tin octoate.

The required effect of the alkyd resins is governed by their content of polyols with at least 3 OH groups in which the ratio of oxygen atoms to carbon atoms does not exceed 0.7:1. We have found by comparison tests, reported in the examples hereinbelow, that non-drying, fatty-acid-modified alkyd resins containing polyols richer in oxygen, for example glycerol or pentaerythritol (U.S. patent specification 2,479,836), are not suitable for after-treatment because white pigments coated with them turn dark gray in color during grinding in steam jet mills of the kind in common use today.

The resins used in accordance with the invention are employed in quantities of from about 5% by weight to 0.1% by weight and preferably in quantities of from about 2 to 0.5% by weight, based on the dry pigment. It is possible to use pure substances or mixtures thereof.

The substances used in accordance with the invention are best added to the pigment in emulsified or dissolved form. Hydroxyethylated fatty acids, hydroxyethylated fatty alcohols or hydroxyethylated alkyl phenols, for example, may be used as aids in the preparation of aqueous emulsions of the resins used in accordance with the invention. Polyesters of fatty acids and hydroxyethylated polyols have proved to be particularly suitable emulsifiers. To prepare solutions, it is best to use solvents of the kind which have already been described as suitable after-treatment agents. Thus, particularly suitable solvents include polyol ethers of the kind formed during the reaction of polyhydric alcohols with monofunctional alcohols such as for example the mono-, di- or tri-ethers of trimethylol propane with n-propanol, n-butanol, benzyl alcohol and so on (cf. Belgian patent specification 736,315). It is also possible to use the etherification products obtainable from polyhydric alcohols and alkylene oxides of the kind obtained for example during the reaction of butane diol, hexane triol or trimethylol propane with ethylene oxide or propylene oxide (cf. German Offenlegungsschrift 1,467,442).

The stage during production of the pigment at which the agent influencing dispersibility is added to the pigment is not of crucial importance. Treatment can be carried out by adding the organic substance in undiluted, dissolved or emulsified form to the untreated or inorganically after-treated pigment before or during the final grinding, for example in a disc attrition mill, ball mill, bowl mill or steam jet mill.

Another method of carrying out the treatment for example on titanium dioxide is to mix the substances used in accordance with the invention with the pigment in its filter cake after coating with inorganic substances such as for example oxides or hydrates of alumina or silica in a kneading operation. The pigment containing 94 to 98% $TiO_2$ is then dried and ground.

Any inorganic white pigments and colored pigments may be used for the process. Particularly advantageous results are obtained with titanium dioxide, iron oxide and chromium oxide pigments. The dispersion behavior of $TiO_2$ pigments in plastics and lacquer resin binders is tested in so-called dissolver tests or throwing-in-tests.

THROWING-IN-TEST

A black PVC rough sheet is prepared on mixing rolls. The titanium dioxide pigment to be tested is then thrown-in on to this black sheet over a period of 30 seconds. Any pigment adhering to the mixing rolls is scraped off with a spatula and also incorporated into the sheet. The sheet is turned manually throughout the entire operation. After the first, second, fourth, eighth and sixteenth minute, taken from the end of throwing-in, samples are taken from the sheet on the mixing rolls during mixing.

The dispersibility of the pigments can be assessed from the non-dispersed pigment agglomerates in the form of spots and streaks. Marks of 1 to 5 are given to the samples: 1=very good; 2=good; 3=satisfactory; 4=moderate; 5=poor. The test gives results that can be reproduced highly effectively with some practice.

COMPOSITION OF THE BLACK SHEET

| | Parts by weight |
|---|---|
| Emulsion PVC (K value 70) | 50 |
| Dioctylphthalate | 22.50 |
| Diphenylthiourea | 0.25 |
| Finely divided carbon black | 0.15 |

PROCESSING CONDITIONS

Temperature 165° C., 15 r.p.m. on the front roller and 12 r.p.m. on the rear roller. Film thickness 180–200μ.

DISSOLVER TEST 10 g. of the pigment to be examined are introduced into a PVC black paste and dispersed for 5 minutes at 2500 r.p.m. with a laboratory stirrer fitted with a dissolver disc. Samples are taken after 1, 3 and 5 minutes. These samples are drawn onto white cardboard by means of a 240 mμ film drawer and then gelled for 15 minutes at 120° C. Dispersibility can readily be assessed from clearly visible pigment specks and from the different shades of gray of the samples. Marks of 1 to 5 are given to the samples: 1=very good; 2=good; 3=satisfactory; 4=moderate; 5=poor.

PREPARATION OF THE PVC BLACK PASTE

| | Parts by weight |
|---|---|
| Emulsion PVC (K value 70) | 100 |
| Dioctyl phthalate | 42 |
| Diphenylthiourea | 0.5 |
| Finely divided carbon black | 0.2 | are ground twice on a 3-roll stand, 25 parts of plasticizer are added and the mixture is stirred with a glass rod.

SHELF LIFE

The shelf life was tested as follows: the pigment prepared was stored for 4 weeks under a pressure of 50 g./cm.$^2$. The products were then re-tested by the dissolver test. The results are set out in Table 1.

FLOW PROPERTIES

The flow properties of a plasticizer/pigment dispersion were characterized by the viscosity of the dispersion. 100 g. of the pigments to be tested and 100 g. of dialkyl phthalate are ground twice on a 3-roll stand. The viscosities were measured in a Haake VT23 visco-tester. To this end, the paste to be tested was introduced into the measuring beaker up to the upper mark. The measuring beaker was then placed in the apparatus and tempered for 10 minutes at 20° C. Measurement was carried out with an SV II measuring block at the speed stage 1. Precautions should be taken to ensure that the measuring block continues rotating until a constant value has been adjusted on the scale of the testing instrument.

WHITENESS

To test whiteness, the color of the pigment is determined in oil:

2.5 g. of the $TiO_2$ pigments treated in accordance with the invention and 2.5 g. of a $TiO_2$ pigment which had been treated similarly but without the substances used in accordance with the invention are made into a paste by hand with 1.5 ml. of linseed oil and then ground with a pigment rubbing machine (Automatik Muller, a product of Engelsmann) at 3× 25 revolutions and with two added weights. The pastes were applied successively to lacquered cardboard squares by means of a 30 micron film drawer, and compared visually with one another under a daylight lamp. Marks were given on an arbitrary scale from −6 to +6. −6 means that the film is very much darker than a comparison sample, −1 means that it is just recognizably darker than the comparison sample, +1 means that it is just recognizably lighter, whilst +6 means that it is very much lighter than the comparison sample. The same color is characterized by ±0.

The invention is illustrated in the following examples and series of tests. The values for dispersibility, whiteness and flow properties determined by the methods described above are set out in Table I.

EXAMPLE A

Preparation of the alkyd resins used in accordance with the invention (1) 1164 parts by weight of 2-ethyl-hexanoic acid, 2050 parts by weight of 1,2,6-hexane triol, 1300 parts by weight of phthalic acid anhydride and 118 parts by weight of maleic acid anhydride were condensed up to an acid number of 19.

(2) 1280 parts by weight of first-runnings fatty acid (average molecular weight 145), 2040 parts by weight of trimethylol propane, 1428 parts by weight of phthalic acid anhydride and 130 parts by weight of maleic acid anhydride were condensed up to an acid number 20.

(3) 1302 parts by weight of phthalic acid anhydride, 1526 parts by weight of palmitic acid, 72 parts by weight of 1,3-butane diol and 1484 parts by weight of trimethylolpropane were condensed up to an acid number of 15.

EXAMPLE B

Preparation of the pigments according to the invention (1) A $TiO_2$ furnace clinker of rutile structure obtained by the sulfate process which had been ground and graded was subjected to an inorganic after-treatment comprising the precipitation of hydrous oxide of aluminum. This after-treatment was carried out with intensive stirring in an aqueous suspension containing approximately 20% by weight of $TiO_2$ at a temperature of 60° C. The slurry was then filtered through a rotary filter and washed. The rotary filter product was made into a paste with water and delivered to a second rotary filter. The washed rotary filter product from the second filter (solids content 60%) was dried at 140 to 170° C. The pigment containing approximately 97% of $TiO_2$ was micronized in a jet mill operated with superheated steam.

(2) A $TiO_2$ pigment of rutile structure obtained by the vapor-phase oxidation of titanium tetrachloride was inorganically after-treated in accordance with Example B(1).

(3) Following after-treatment and drying, the same rutile pigment as in Example B(1) was sprayed with an aqueous emulsion of an alkyd resin which had been obtained from 1 mole of phthalic acid anhydride, 0.255 mole of glycerol, 1.7 mole of diethylene glycol and 2 moles of coconut fatty acid, and which had an acid number of 15 to 25. The quantity used amounted to 0.5% by weight of resin component, based on $TiO_2$. Grinding in a jet mill was carried out as in Example B(1).

(4) Following after-treatment and drying, the same rutile pigment as in Example B(1) was sprayed with an emulsion of the alkyd resin of Example A(1) consisting of 2000 parts by weight of resin 1, 95 parts by weight of triethylamine, 300 parts by weight of emulsifier (the emulsifier had been obtained by condensing 1 mol of hydroxyalkylated polytrimethylene oxide alcohol [13 ethylene oxide/OH] with 0.8 mole of oleic acid) and 1500 parts by weight of water, in a quantity corresponding to 1.0% by weight of alkyd resin based on $TiO_2$. The pigment was then ground in a steam jet mill under the same conditions as in Example B(1).

(5) Following after-treatment and drying, the same rutile pigment as in Example B(1) was sprayed with an emulsion of the alkyd resin of Example A(2) (1.0% by weight of resin component, based on the pigment) consisting of 2000 parts by weight of the alkyd resin, 95 parts by weight of triethylamine, 300 parts by weight of emulsifier (the emulsifier was obtained by condensing 1 mole of hydroxyalkylated polytrimethylene oxide alcohol [13 ethylene oxide/OH] with 0.8 mole of oleic acid) and 1700 parts by weight of water, and ground in a steam jet mill as in Example B(1).

(6) 2 parts by weight of the alkyd resin of Example A(2) were dissolved in 1 part by weight of a mixture of trimethylol propane mono- and dibutyl ether (OH number 410). The same rutile pigment as in Example B(1) was sprayed with 1.5% by weight of the solution, based on the pigment, and ground in a steam jet mill.

(7) A $TiO_2$ pigment prepared in accordance with Example B(2) was sprayed with 1.5% by weight of the mixture of alkyd resin and trimethylol propane ether mentioned in Example B(6), and ground in a steam jet mill.

(8) 2 parts by weight of the alkyd resin of Example A(3) were dissolved in 1 part by weight of a trimethylol propane reacted with 3.5 moles of ethylene oxide in accordance with German Offenlegungsschrift 1,467,442. The same rutile of this solution and ground in a steam jet mill.

TABLE I

| Pigment according to Example B | Organic substance quantities in percent by weight, based on $TiO_2$ | Paste viscosity in cp. at 20° C. | Dispersibility in PVC | | Shelf life after 4 weeks | Color in oil |
|---|---|---|---|---|---|---|
| | | | Dissolver test | Throwing-in-test | | |
| 1 | None | >90,000 | 5 | 5 | 5 | ±0 |
| 2 | None | >90,000 | 5 | 5 | 5 | +2 |
| 3 | 0.5% of alkyd resin according to U.S. Pat. 2,479,836 in the form of an emulsion with water. | 7,900 | 2 | 3 | 2 | −5 |
| 4 | 1.0% of alkyd resin A(1) in the form of an emulsion with water | 4,280 | 2 | 3 | 2 | ±0 |
| 5 | 1.0% alkyd resin A(2) in the form of an emulsion with water | 5,300 | 2 | 3 | 2 | ±0 |
| 6 | 1.5% solution of 2 parts by weight of alkyd resin A(2) in 1 part by weight of mono and dibutyl ether of trimethylol propane, OH number of the mixture 410. | 4,240 | 2 | 2 | 2 | ±0 |
| 7 | As in Example 6 | 2,200 | 1 | 2 | 1 | +2 |
| 8 | 1.0% solution of 2 parts by weight of alkyd resin A(3) in 1 part by weight of trimethylol propane reacted with 3.5 moles of ethylene oxide per mole. | 4,100 | 1 | 1 | 1 | ±0 |

It will be appreciated that the instant specification and examples are set forth by way of illustration and not limitation and that various modifications and changes may be made without departing from the spirit and scope of the present invention.

What is claimed is:

1. A readily dispersible inorganic pigmented coated with about 0.1 to 5% by weight of a non-drying fatty-acid-modified alkyd resin, the alkyd resin including radicals of a polycarboxylic acid and at least about 25% by weight of the radicals of fatty acids containing more than 6 carbon atoms, and further including radicals of polyols containing at least 3 hydroxyl groups, the ratio of oxygen atoms to carbon atoms in the polyol molecule not exceeding 0.7:1.

2. A coated pigment according to claim 1, wherein the inorganic pigment comprises titanium dioxide.

3. A coated pigment according to claim 1, wherein the fatty acid radicals contain about 7 to 18 carbon atoms.

4. A coated pigment according to claim 1, wherein the used fatty acid is obtained by the oxidation of a mixture of paraffinic hydrocarbons.

5. A coated pigment according to claim 1, wherein said polyol comprises trimethylol propane.

6. A coated pigment according to claim 1, wherein the inorganic pigment comprises titanium dioxide and the coating is present in about 0.5 to 2% by weight of the inorganic pigment, the polyol comprising trimethylol propane and the fatty acid radicals containing about 7 to 18 carbon atoms and the fatty acid being obained by the oxidation of a mixture of paraffinic hydrocarbons.

7. A dry coated pigment according to claim 1, wherein the inorganic pigment is an oxide of titanium, iron or chromium.

References Cited

UNITED STATES PATENTS

| | | | |
|---|---|---|---|
| 2,805,961 | 9/1957 | Puddington et al. | 106—308 Q |
| 3,450,666 | 6/1969 | Nease | 106—308 Q |
| 3,451,835 | 6/1969 | Ganter et al. | 106—308 Q |
| 2,907,670 | 10/1959 | Katz et al. | 106—308 Q |
| 2,927,863 | 3/1960 | Marotta | 106—308 Q |
| 3,451,835 | 6/1969 | Ganter et al. | 106—300 X |
| 3,076,719 | 2/1963 | Whately et al. | 106—300 |

FOREIGN PATENTS

| | | | |
|---|---|---|---|
| 667,517 | 7/1965 | Belgium | 106—308 Q |
| 1,467,479 | 12/1968 | German Offenlegungsschrift | 106—300 |

OTHER REFERENCES

Hornby et al.: J. Oil Colour Chem. Ass., 52(11), pp. 1035-49 (1969).

Chemical Abstracts, vol. 65, 2475h (1966).

Chemical Abstracts, vol. 67, 118167w–118168x (1967).

HELEN M. S. SNEED, Primary Examiner

U.S. Cl. X.R.

106—308 Q